United States Patent
Cheng et al.

(10) Patent No.: US 8,914,793 B2
(45) Date of Patent: Dec. 16, 2014

(54) REMOTE UPGRADE SERVERS AND LOAD BALANCING METHODS THEREOF

(71) Applicant: Quanta Computer Inc., Kuei Shan Hsiang, Tao Yuan Shien (TW)

(72) Inventors: Hung-Pin Cheng, Tao Yuan Shien (TW); Chin-Cheng Chuo, Tao Yuan Shien (TW); Tsung-Ying Hsieh, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 56 days.

(21) Appl. No.: 13/934,379

(22) Filed: Jul. 3, 2013

(65) Prior Publication Data

US 2014/0196021 A1  Jul. 10, 2014

(30) Foreign Application Priority Data

Jan. 4, 2013  (TW) .............................. 102100190 A

(51) Int. Cl.
  *G06F 9/44*  (2006.01)
  *G06F 9/445*  (2006.01)
(52) U.S. Cl.
  CPC ........................................ *G06F 8/65* (2013.01)
  USPC ....................................................... 717/173

(58) Field of Classification Search
  USPC .................................................. 717/168–173
  See application file for complete search history.

(56) References Cited

U.S. PATENT DOCUMENTS

2012/0071178 A1*  3/2012  Sun et al. ...................... 455/458
2012/0331478 A1*  12/2012  Zhu et al. ..................... 718/104

* cited by examiner

*Primary Examiner* — Anna Deng
(74) *Attorney, Agent, or Firm* — McClure, Qualey & Rodack, LLP

(57) ABSTRACT

A remote upgrade server having a networking module and a processing unit is provided. The networking module provides a network access service. The processing unit receives an update checking request from a mobile communication device via the networking module, and determines a delay time period according to a current networking load in response to the update checking request. Also, the processing unit transmits an update configuration file including the delay time period to the mobile communication device via the networking module, so that the mobile communication device downloads the system update file from the remote upgrade server after the delay time period.

6 Claims, 5 Drawing Sheets

REMOTE UPGRADE SERVERS AND LOAD BALANCING METHODS THEREOF

CROSS REFERENCE TO RELATED APPLICATIONS

This Application claims priority of Taiwan Patent Application No. 102100190, filed on Jan. 4, 2013, the entirety of which is incorporated by reference herein.

BACKGROUND OF THE INVENTION

1. Field of the Invention

The invention generally relates to system update procedures of mobile communication devices, and more particularly, to system update procedures for updating mobile communication devices with networking load balancing of a remote upgrade server.

2. Description of the Related Art

With rapid developments in the mobile communications industry, various devices such as feature phones, smart phones, panel Personal Computers (PCs), and Notebook PCs, etc., are becoming necessities of life. For fixing leaks or bugs in the operating systems (e.g., Android, and iOS, etc.) of the mobile communication devices, periodic or even continual system updates are provided, wherein problems may occur therefrom.

For example, a conventional system update procedure may require manufacturers to retrieve each and every one of their sold devices for system updates thereof, which disadvantageously consumes a great deal of time and manpower. Alternatively, another conventional system update procedure may require the installation of a remote upgrade server which broadcasts information of available system updates to trigger the mobile communication devices for system updates with the remote upgrade server. However, the broadcasts of information of available system updates occupy system and network resources of the remote upgrade server. Also, with many mobile communication devices connecting to the remote upgrade server at the same time for system updates, overflow or crashing of the remote upgrade server may occur.

Thus, it is desirable to have a more flexible way of system updates for mobile communication devices.

BRIEF SUMMARY OF THE INVENTION

In one aspect of the invention, a remote upgrade server is provided. The remote upgrade server comprises a networking module and a processing unit. The networking module is configured to provide a network access service. The processing unit is configured to receive an update checking request from a mobile communication device via the networking module, determine a delay time period according to a current networking load, in response to the update checking request, and transmit an update configuration file comprising the delay time period to the mobile communication device via the networking module, so that the mobile communication device downloads the system update file from the remote upgrade server after the delay time period.

In another aspect of the invention, a load balancing method for a system update procedure between a mobile communication device and a remote upgrade server is provided. The load balancing method comprises the steps of: transmitting, by the mobile communication device, an update checking request to the remote upgrade server; determining, by the remote upgrade server, a delay time period according to a current networking load, in response to the update checking request; transmitting, by the remote upgrade server, an update configuration file comprising the delay time period to the mobile communication device; and downloading, by the mobile communication device, a system update file from the remote upgrade server after the delay time period.

Other aspects and features of the invention will become apparent to those with ordinary skill in the art upon review of the following descriptions of specific embodiments of the remote upgrade servers and load balancing methods.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
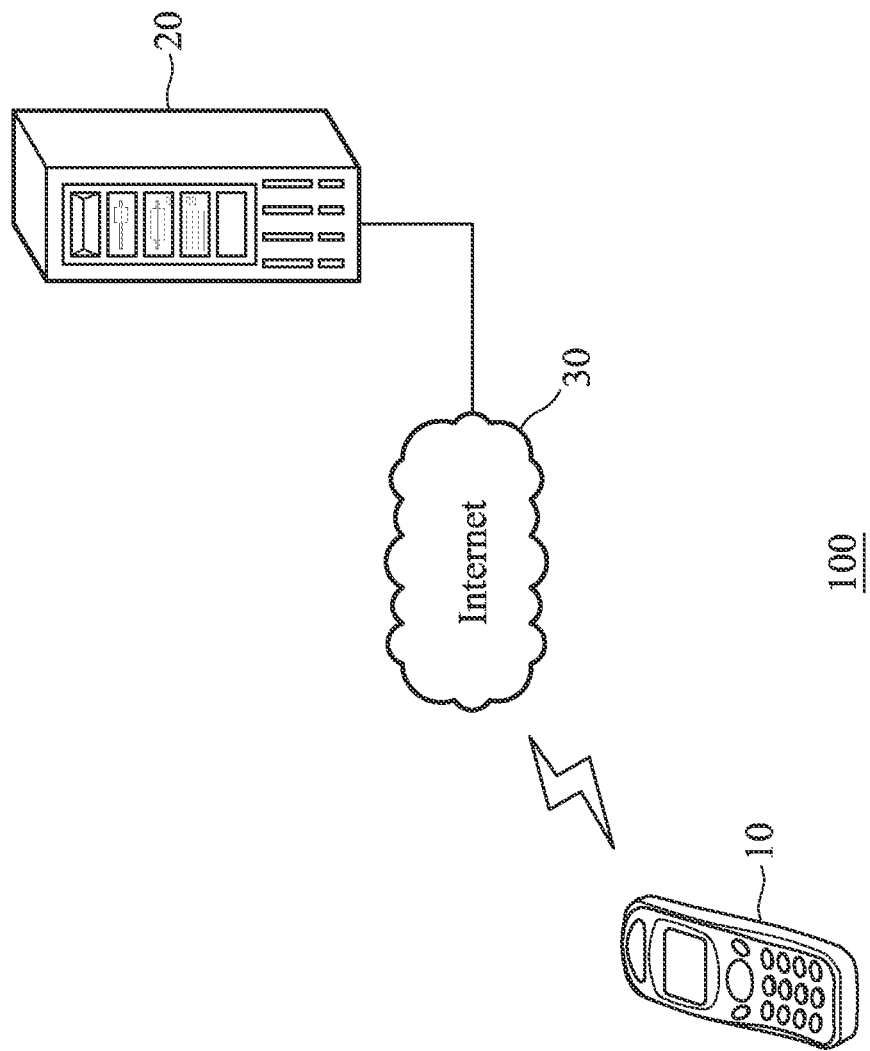
FIG. 1 is a block diagram illustrating a mobile communication environment according to an embodiment of the invention.

FIG. 1 is a block diagram illustrating a mobile communication environment according to an embodiment of the invention. In the mobile communication environment 100, a mobile communication device 10 is wirelessly connected to the Internet 30 and further connected to a remote upgrade server 20 via the Internet 30. The mobile communication device 10 may be a feature/smart phone, a tablet PC, a laptop computer (or called notebook), or any computing device capable of wireless communications. Alternatively, in another embodiment, the mobile communication device 10 may be a combination of a computing device without the function of wireless communications and a wireless communication dongle.

The wireless connection between the mobile communication device 10 and the Internet 30 may be established using the Wireless Local Area Network (WLAN) technology, such as the Wireless Fidelity (WiFi) technology, or the Bluetooth technology, etc., or the cellular network technology (or called Wide Area Network (WAN) technology), such as the Global System for Mobile communications (GSM) technology, the General Packet Radio Service (GPRS) technology, the Enhanced Data rates for Global Evolution (EDGE) technology, the Wideband Code Division Multiple Access (WCDMA) technology, the Code Division Multiple Access 2000 (CDMA-2000) technology, the Time Division-Synchronous Code Division Multiple Access (TD-SCDMA) technology, the Worldwide Interoperability for Microwave Access (WiMAX) technology, the Long Term Evolution (LTE) technology (including the LTE Frequency-Division Duplex (LTE-FDD) technology and the LTE Time-Division Duplex (LTE-TDD) technology), and the Time-Division LTE (TD-LTE) technology, etc.

Although not shown, the mobile communication device 10 may be selectively connected to a WLAN (not shown) or a cellular network (not shown) using a wireless technology, and then connected to the Internet 30 via the WLAN or cellular network.

In addition, the Operating System (OS) of the mobile communication device 10 may be the Android, iOS, bada OS, MeeGo, Palm OS, WebOS, Windows Mobile, Asha, Symbian OS, or BlackBerry OS system, etc., which is provided as a platform for software execution. In order to fix the system leaks or bugs in the OS of the mobile communication device 10, system update files may be downloaded from the remote upgrade server 20 for updates of the OS of the mobile communication device 10. The remote upgrade server 20 may be a server installed on the Internet 30 for providing system update services to the remotely located mobile communication device 10.

In one embodiment, the remote upgrade server 20 may store the system update file for the mobile communication device 10, and transmit the system update file to the mobile communication device 10 by request. In another embodiment, the system update file may be stored in a storage device independently from the remote upgrade server 20, and by request, the system upgrade server 20 may reply to the mobile communication device 10 with a link address of the storage device.

Figure 2:
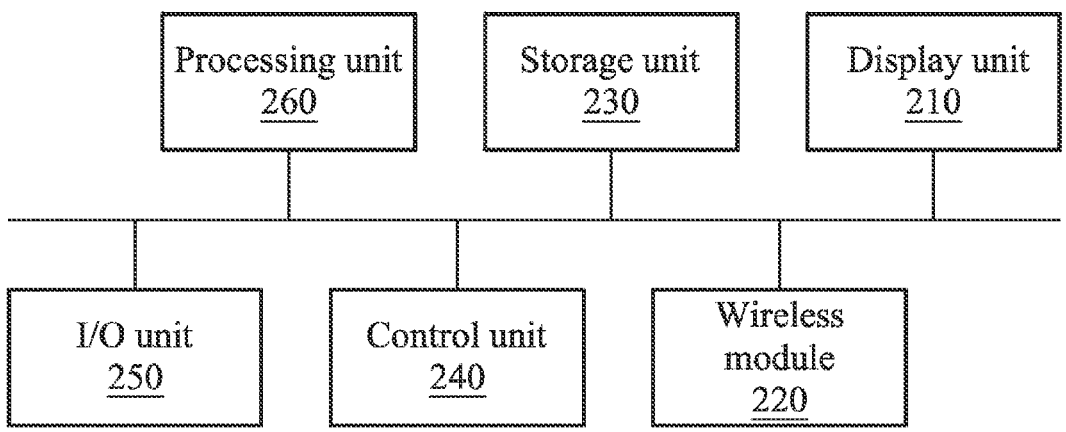
FIG. 2 is a block diagram illustrating a mobile communication device according to an embodiment of the invention.

FIG. 2 is a block diagram illustrating a mobile communication device according to an embodiment of the invention. The display unit 210 may be a screen, a display panel, a touch screen, or any device with displaying functionality. The wireless module 220 is responsible for providing wireless access services using particular wireless technology, such as the WLAN technology and/or the cellular network technology. The wireless module 220 may comprise a baseband unit (not shown) and a Radio Frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted.

The storage unit 230 may be a volatile memory (e.g., a Random Access Memory (RAM)), a non-volatile memory (e.g., a Flash memory), a hard disc, an optical disc, or any combination thereof, for storing the client software for carrying out the load balancing method of the invention (referred to herein as "the connection management program" for ease of understanding). The control unit 240 and the Input/Output (I/O) unit 250 are responsible for communicating control signals and data signals between the units/components within the mobile communication device 10, respectively. The processing unit 260 may be general-purpose processor, an application processor, or a Micro-Control Unit (MCU) for executing machine-readable instructions to control the operations of the display unit 210, the wireless module 220, the storage unit 230, the control unit 240, and the I/O unit 250. Also, the processing unit 260 is responsible for loading and executing the connection management program stored in the storage unit 230 to perform the load balancing method of the invention.

Figure 3:
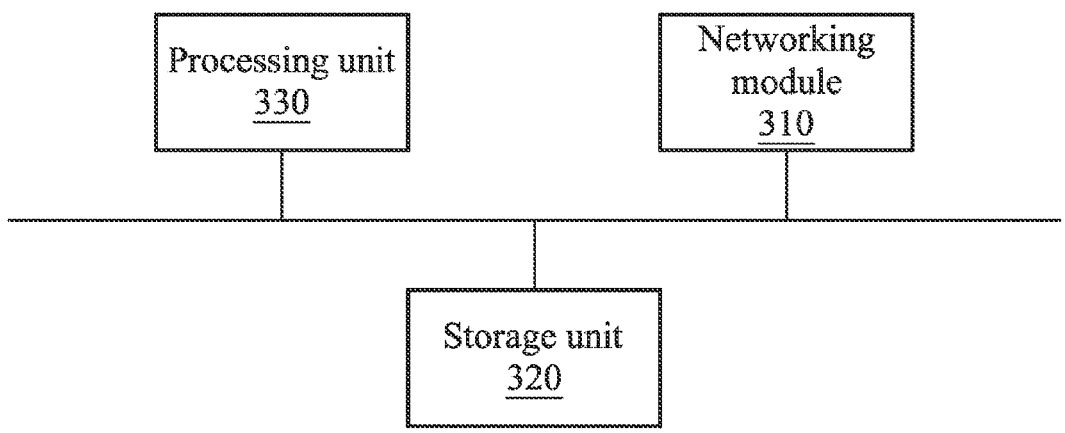
FIG. 3 is a block diagram illustrating a remote upgrade server according to an embodiment of the invention.

FIG. 3 is a block diagram illustrating a remote upgrade server according to an embodiment of the invention. The networking module 310 is responsible for providing wired or wireless network access services. The storage unit 320 may be a memory, a hard disc, an optical disc, or any combination thereof, for storing the system update file(s) for the mobile communication device 10 and the server software for carrying out the load balancing method of the invention (referred to herein as "the update management program" for ease of understanding). The processing unit 330 may be a general-purpose processor, an application processor, or an MCU, for executing machine-readable instructions to control the operations of the networking module 310 and the storage unit 320, and for loading and executing the update management program stored in the storage unit 320 to perform the load balancing method of the invention.

To further clarify, the load balancing method of the invention is performed by the cooperation of the mobile communication device 10 and the remote upgrade server 20 (i.e., the connection management program and the update management program), for system updates of the mobile communication device 10.

Figure 4:
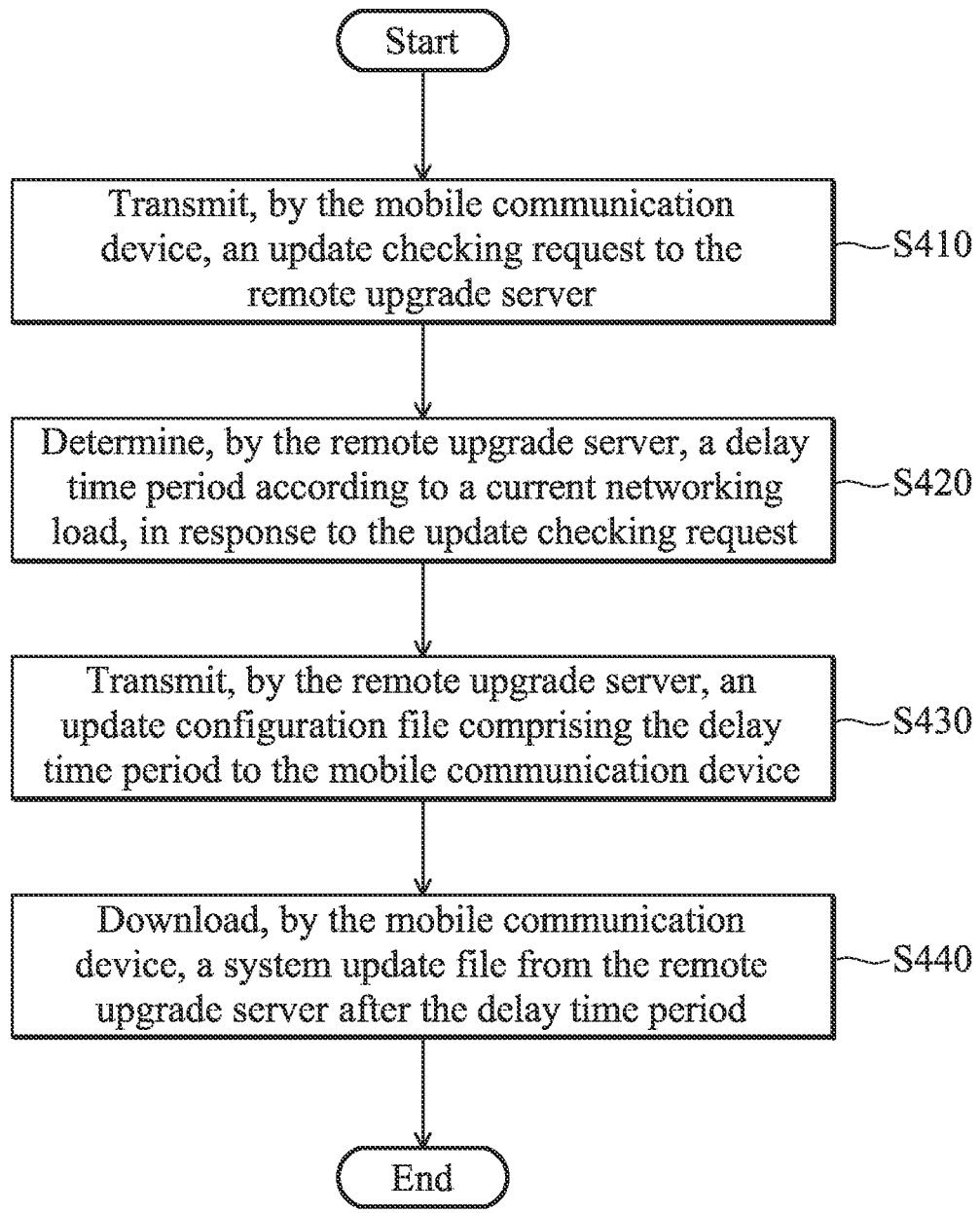
FIG. 4 is a flow chart illustrating the load balancing method according to an embodiment of the invention.

FIG. 4 is a flow chart illustrating the load balancing method according to an embodiment of the invention. The load balancing method may be applied for a system update procedure between a mobile communication device and a remote upgrade server. To begin, the mobile communication device transmits an update checking request to the remote upgrade server (step S410). In response to the update checking request, the remote upgrade server determines a delay time period according to a current networking load (step S420). Specifically, the remote upgrade server may obtain the current number of packets currently being processed to determine the current traffic rate, or may determine the amount of mobile communication devices which are downloading their corresponding system update files from the remote upgrade server, thereby generating the current networking load according to the current traffic rate and/or the amount of downloading mobile communication devices.

Next, the remote upgrade server transmits an update configuration file comprising the delay time period to the mobile communication device (step S430). After the delay time period, the mobile communication device downloads the system update file from the remote upgrade server (step S440). Specifically, the update configuration file may comprise information concerning the available version(s) of the system update file for the mobile communication device, and thus, in step S430, the mobile communication device may compare the current version of its OS with the available version(s) of the system update file, if there are any, to determine if any of the available version(s) is newer than the current version. If so, step S440 is performed. Alternatively, in another embodiment, after receiving the update configuration file, the mobile communication device may prompt the user with the information concerning the available versions(s) of the system update file, and then let the user decide whether or not to perform the system update of the mobile communication device.

Figure 5:
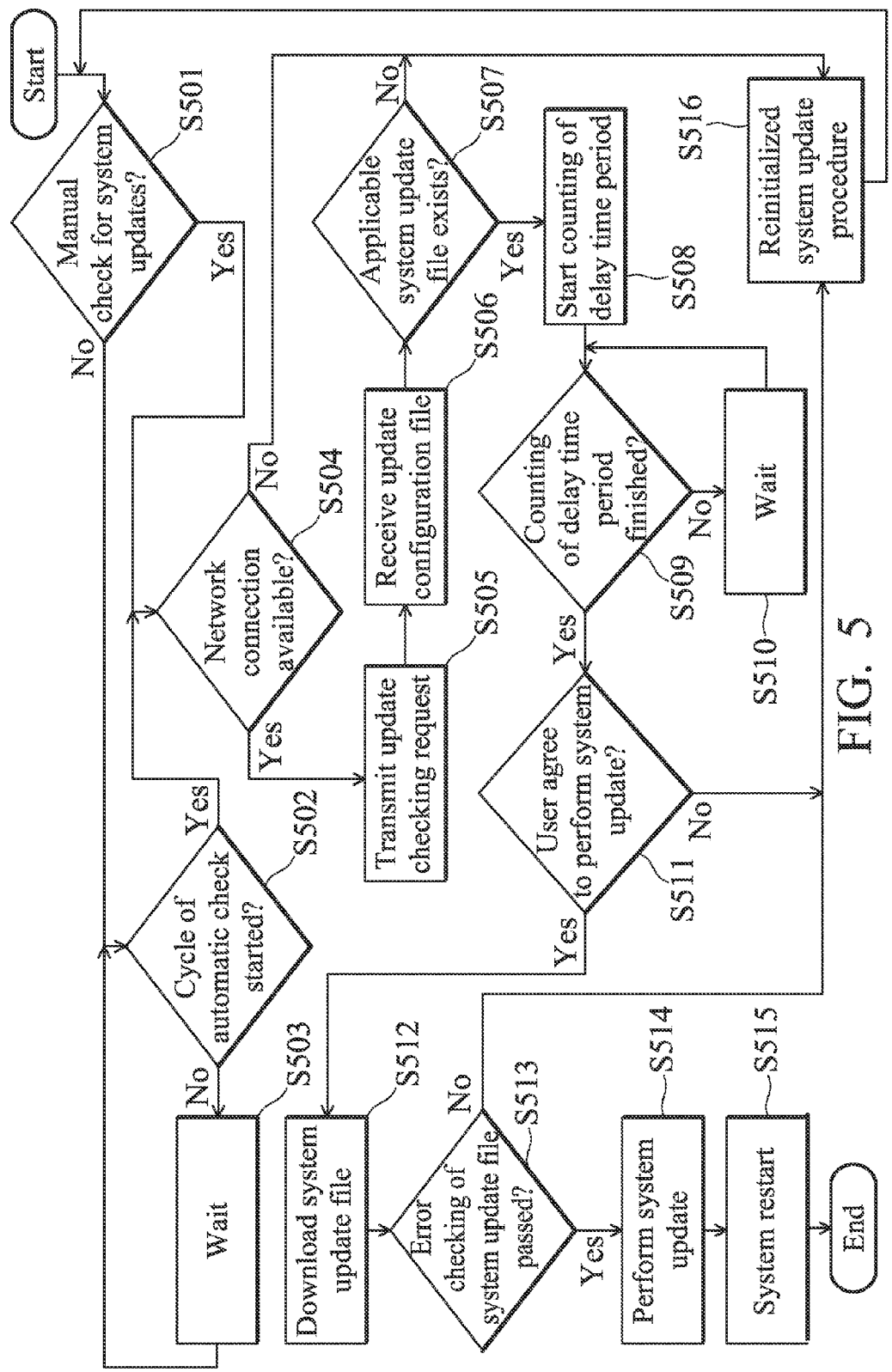
FIG. 5 is a flow chart illustrating the execution process of the connection management program according to an embodiment of the invention.

FIG. 5 is a flow chart illustrating the execution process of the connection management program according to an embodiment of the invention. To begin, it is determined whether to perform a manual check for system updates (step S501). If not, it means that an automatic check for system updates is to be performed, and thus it is subsequently determined whether a cycle of the automatic check has started (step S502), and if not, the connection management program waits for the start of a next cycle of the automatic check (step S503). Subsequent to steps S502 and S501, if so, it is determined whether a network connection is available (step S504). In response to a network connection being available, an update checking request is transmitted to the remote upgrade server according to the Uniform Resource Locator (URL) of the remote upgrade server which is preconfigured in the connection management program (step S505), and then an update configuration file is received from the remote upgrade server (step S506).

Specifically, the update checking request may comprise the hardware capability information, such as a machine model, and supported wireless technology or technologies, etc., of the mobile communication device. In one embodiment, the hardware capability information may be mapped into a predetermined device number, and the mapping relationship may be maintained in both of the mobile communication device and the remote upgrade server. Thus, the mobile communication device may only include the predetermined device number in the update checking request, and the remote upgrade server may identify the corresponding hardware capability information according to the predetermined device number in the update checking request. The update configuration file may comprise a delay time period and information concerning one or more available versions of the system update file for the mobile communication device.

After that, it is determined if there's a system update file applicable for the mobile communication device (step S507), and if so, the counting of the delay time period is started (step S508). Next, it is determined whether the counting has completed (step S509), and if not, the connection management program waits for the completion of the counting (step S510). Subsequent to step S509, when the counting of the delay time period is completed, the user of the mobile communication device is prompted with an indication of whether he/she agrees to perform the system update of the mobile communication device (step S511), and if so, the downloading of a system update file is started according to the link address specified in the update configuration file (step S512).

After downloading the system update file, it is checked whether there is an error with the system update file (step S513). Specifically, the error checking may be performed using the Cycle Redundancy Check (CRC) or Message-Digest Algorithm 5 (MD5). If the error checking has passed (i.e., no error with the system update file), the system update of the mobile communication device is performed using the system update file (step S514), and then the OS of the mobile communication device is restarted after the system update (step S515), to end the process.

In addition, subsequent to steps S504, S507, S511, and S513, if not, the system update procedure is reinitialized (step S516), and the process loops back to step S501.

Note that, for a conventional system update of a mobile communication device, the mobile communication device is required to be connected to a computer, and an additional connection control program is required to be pre-installed in the mobile communication device and the computer for the communications therebetween, so that the system update of the mobile communication device may be accomplished via the computer. To the contrary, in the present invention, the system update procedure may be performed independently by the mobile communication device, without the assistance of any other devices at the user's end. That is, the entire process of the system update procedure is simplified, and the cost thereof is reduced and the performance thereof is improved.

Figure 6:
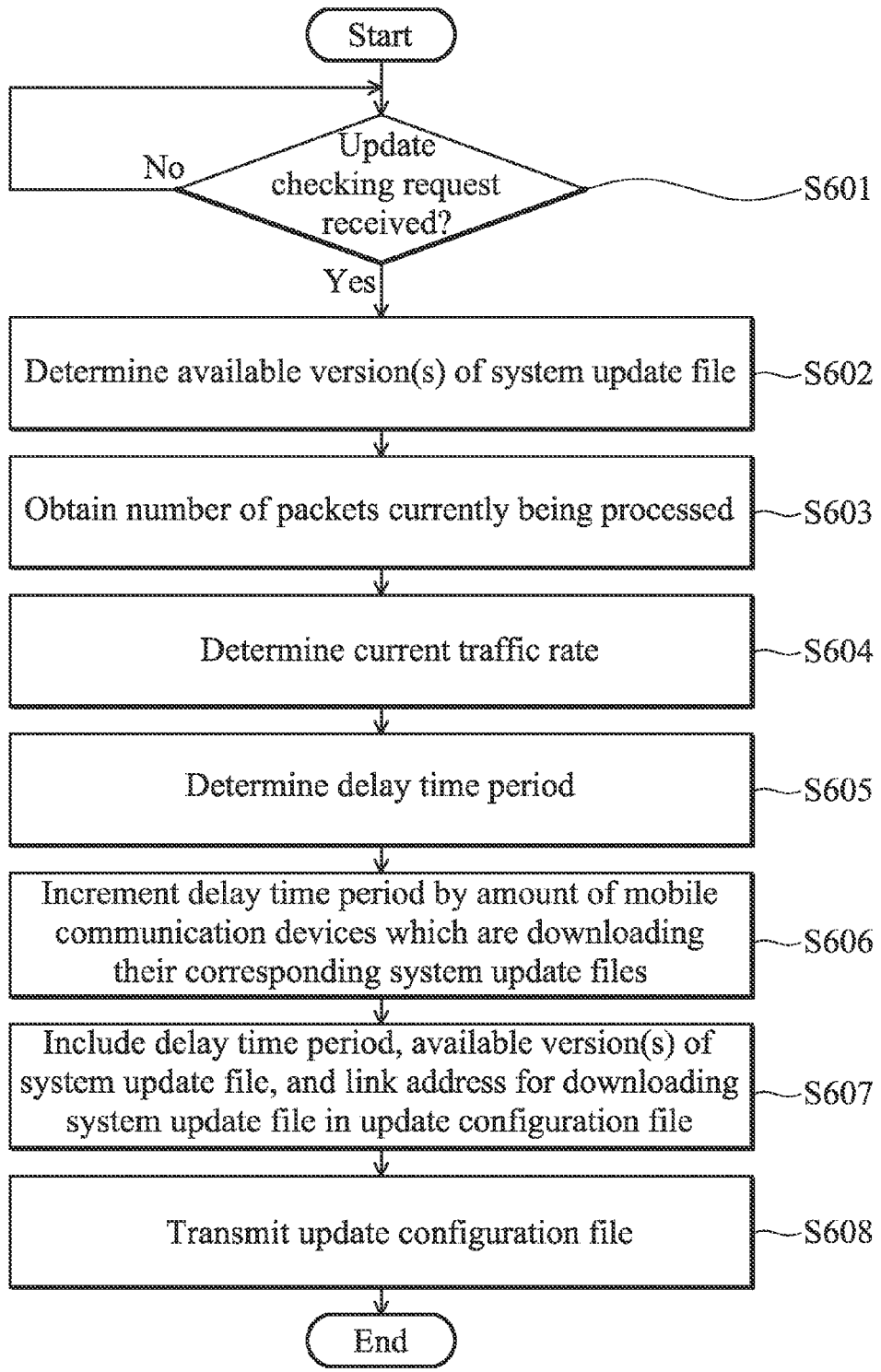
FIG. 6 is a flow chart illustrating the execution process of the update management program according to an embodiment of the invention.

FIG. 6 is a flow chart illustrating the execution process of the update management program according to an embodiment of the invention. To begin, it is determined whether an update checking request has been received from the mobile communication device (step S601), and if not, the process loops back to step S601 to wait for the update checking request. Otherwise, if the update checking request has been received, available version(s) of the system update file for the mobile communication device is/are determined according to the hardware capability information specified in the update checking request (step S602). Next, the current networking load of the remote upgrade server is generated. Specifically, for the generation of the current networking load, the number of packets currently being processed by the remote upgrade server is obtained (step S603), and the current traffic rate is determined according to the number of packets currently being processed (step S604). For example, if the maximum bandwidth of the remote upgrade server is 100 M/bps and the number of packets currently being processed has reached 80 M/bps, then the current traffic rate may be estimated to be 80 percent.

Subsequently, a delay time period is determined according to the current traffic rate (step S605). In one embodiment, a mapping table of traffic rates and corresponding delay time periods may be preconfigured, and the delay time period may be determined from the mapping table using the current traffic rate. An exemplary mapping table of traffic rates and corresponding delay time periods is given below.

TABLE 1

| Traffic rate | Delay time period |
|---|---|
| 0~50% | 50 seconds |
| 50~80% | 100 seconds |
| 80~100% | 200 seconds |

In another embodiment, the delay time period may be determined by multiplying the current traffic rate by a predetermined multiple. For example, if the current traffic rate is 80 percent and the predetermined multiple is 2, then the delay time period equals 80*2=160 seconds.

After that, an amount of mobile communication devices which are downloading their corresponding system update files from the remote upgrade server is determined, and the delay time period is further incremented by the determined amount (step S606). For example, if the delay time period determined in step S605 equals 160 seconds and there are 15 mobile communication devices currently downloading their corresponding system update files from the remote upgrade server, then the delay time period is incremented by 15 seconds more. Next, the delay time period, the available version(s) of the system update file, and the link address for downloading the system update file are included in an update configuration file (step S607), and then the update configuration file is transmitted to the requesting mobile communication device (step S608).

By the load balancing method as described above, the remote upgrade server of the invention may effectively lower the amount of mobile communication devices which are downloading their corresponding system update files from the remote upgrade server at the same time, so as to prevent overflow or crashing of the remote upgrade server and thus improving the operational stability of the remote upgrade server.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A remote upgrade server, comprising:
a networking module, configured to provide a network access service; and
a processing unit includes at least one processor, configured to receive an update checking request from a mobile communication device via the networking module, obtain a number of packets currently being processed via the networking module for determining a current traffic rate, determine an amount of mobile communication devices which are downloading their corresponding system update files from the remote upgrade server, generate a current networking load according to the current traffic rate and the amount of mobile communication devices, determine a delay time period according to the current networking load, in response to the update checking request, transmit an update configuration file comprising the delay time period to the mobile communication device via the networking module, so that the mobile communication device downloads the system update file from the remote upgrade server after the delay time period.

2. The remote upgrade server of claim 1, wherein the update checking request comprises hardware capability information of the mobile communication device, and the processing unit is further configured to determine information concerning one or more available versions of the system update file for the mobile communication device, and include the information concerning the available versions of the system update file for the mobile communication device in the update configuration file.

3. A load balancing method for a system update procedure between a mobile communication device and a remote upgrade server, comprising:
transmitting, by the mobile communication device, an update checking request to the remote upgrade server;
obtaining, by the remote upgrade server, a number of packets currently being processed via the networking module for determining a current traffic rate;
determining, by the remote upgrade server, an amount of mobile communication devices which are downloading their corresponding system update files from the remote upgrade server;
generating, by the remote upgrade server, a current networking load according to the current traffic rate and the amount of mobile communication devices;
determining, by the remote upgrade server, a delay time period according to the current networking load, in response to the update checking request;
transmitting, by the remote upgrade server, an update configuration file comprising the delay time period to the mobile communication device; and
downloading, by the mobile communication device, a system update file from the remote upgrade server after the delay time period.

4. The load balancing method of claim 3, wherein the update checking request comprises hardware capability information of the mobile communication device, and the load balancing method further comprises:
determining information concerning one or more available versions of the system update file for the mobile communication device; and
including the information concerning the available versions of the system update file for the mobile communication device in the update configuration file.

5. The load balancing method of claim 3, further comprising:
checking, by the mobile communication device, if there is an error with the system update file after downloading the system update file; and
if not, upgrading a system of the mobile communication device using the system update file.

6. The load balancing method of claim 3, wherein the update checking request is transmitted directly from the mobile communication device to the remote upgrade server, without passing through any other devices at the user's end.

* * * * *